United States Patent [19]

Rim et al.

[11] 4,316,971
[45] Feb. 23, 1982

[54] MODIFIED MONOOLEFIN COPOLYMER ELASTOMER WITH IMPROVED HEAT AND OIL RESISTANCE

[75] Inventors: Yong S. Rim, Woodbridge; John A. Davison, Southington; Walter Nudenberg, Newtown, all of Conn.

[73] Assignee: Uniroyal, Inc., New York, N.Y.

[21] Appl. No.: 40,784

[22] Filed: May 21, 1979

Related U.S. Application Data

[63] Continuation-in-part of Ser. No. 17,298, Mar. 5, 1979, abandoned.

[51] Int. Cl.$^3$ .................... C08F 255/04; C08F 255/06
[52] U.S. Cl. ..................................... 525/310; 525/309; 525/301; 525/303; 525/292
[58] Field of Search ................ 525/303, 308, 309, 310

[56] References Cited

U.S. PATENT DOCUMENTS

| | | | |
|---|---|---|---|
| 3,435,096 | 3/1969 | Limbert | 525/310 |
| 3,538,191 | 11/1970 | Meredith | 525/310 |
| 3,657,395 | 4/1972 | Meredith | 525/310 |
| 3,876,727 | 4/1975 | Meredith | 525/310 |
| 3,923,930 | 12/1975 | Waldbillig | 525/310 |
| 3,953,541 | 4/1976 | Fuji | 525/310 |
| 4,065,521 | 12/1977 | Lachowicz | 525/310 |

*Primary Examiner*—Paul R. Michl
*Attorney, Agent, or Firm*—James J. Long

[57] ABSTRACT

An EPM or EPDM type of elastomer is modified by graft copolymerization with acrylic ester type of monomeric material, said monomeric material being material whose homopolymer has a glass transition temperature of not greater than 6° C., in an amount sufficient to provide an ester group (—COO—) content of from 25 to 40% by weight, to yield a mixed copolymerizate vulcanizable to a heat and oil resistant elastomeric state.

2 Claims, No Drawings

MODIFIED MONOOLEFIN COPOLYMER ELASTOMER WITH IMPROVED HEAT AND OIL RESISTANCE

This application is a continuation-in-part of our commonly assigned copending application Ser. No. 17,298, filed Mar. 5, 1979 now abandoned.

This invention pertains to monoolefin copolymer type elastomers that have been modified by graft polymerization with acrylic ester type monomeric material.

The invention is especially directed to elastomers, which when properly compounded and vulcanized, are characterized by superior resistance to the deteriorating effects of exposure to high temperature and to oil.

More particularly this invention relates to new vulcanizable elastomers which are mixed polymerizates of (A) a rubbery spine which is an elastomeric alphamonoolefin interpolymer, with or without a copolymerizable diene, as exemplified by EPM or EPDM; and, (B) acrylic ester type monomeric material graft copolymerized in the presence of (A).

Optionally, there may also be graft copolymerized in the presence of (A) and (B) a small amount of (C) different additional ethylenically unsaturated monomeric material which serves to enhance the vulcanizability of the copolymerizate.

There is a need for a rubber which has a wide range of service temperatures, for example, over the range of $-25°$ F. to $350°$ F. Conventional butadiene-acrylonitrile, epichlorohydrin and chlorosulfonated polyethylene rubbers have good to moderate oil swell properties but their maximum service temperatures are generally under $300°$ F. Ever-rising temperatures under the hoods of automotive vehicles and other developments in the mechanical goods field have created a demand for more satisfactory high temperature and oil resistant rubbers. Acrylate rubbers have these properties but their low temperature flexibility is poor and processing is often difficult; compression set (an important property for seals and mechanical goods) of acrylate rubbers is often too high. Certain known rubbers made by free radical high temperature and high pressure copolymerization of ethylene and methyl acrylate with small amounts of acrylic acid have good high temperature resistance (up to $350°$ F.) and oil swell resistance (60% volume swell when immersed for 3 days in ASTM No. 3 oil at $300°$ F.), but the usefulness of these products is known to be limited because of their low viscosity, low green strength, as well as stickiness of the mill and tendency to stick in the mold thus making demolding difficult. The present invention is concerned with ameliorating the disadvantages of the various just-described prior art specialty rubbers.

U.S. Pat. No. 3,622,652, Hamed et al., Nov. 23, 1971, discloses grafting of certain acrylates and methacrylates onto olefin copolymer rubbers, but the proportion of acrylates is far below that employed in the present invention.

U.S. Pat. No. 3,981,958, Nakashima etal., Sept. 21, 1976, discloses grafts of methacrylic ester moieties, particularly lower alkyl methacrylates which have a higher glass transition temperature than materials employed in the present invention.

U.S. Pat. No. 4,066,590, Eldred et al., Jan. 3, 1978, discloses olefin copolymer rubber compositions with improved heat and oil resistance made by vulcanizing in a mold a mixture of the rubber with 10–35 phr of one of the following: (a) trimethylolpropane trimethacrylate; (b) polyethylene glycol dimethacrylate; (c) ethylene glycol dimethacrylate; or (d) triallylcyanurate; plus 6 phr of halogenated organic compound, plus 10–25 phr zinc oxide, plus peroxide. The present entirely different composition is concerned with higher levels of ester content.

At the present stage of the art, specialty rubbers are being increasingly subjected to the two principal parameters of heat aging and fluid attack in many applications. In the automotive field, underhood temperatures now average over $120°$ C. resulting in the loss of physical properties of such components as tubing, seals, hoses, diaphrams, and the like. New fuel blends with higher contents of aromatic constituents further contribute to the degradation of physical properties of these components. Thus there is a need for specialty rubbers which will be serviceable in air and/or in contact with hydrocarbon oils at temperatures from $-25°$ to $+180°$ C. Rubbery polymerizates of this invention are capable of meeting these performance requirements.

In one aspect, the concept of the rubbery polymerizate of this invention resides in the finding that it is possible to combine the inherent oil and heat resistance of alkyl acrylate rubbers with the low temperature properties of ethylene-alpha-olefin type rubbers containing no unsaturation (EPM) or very little unsaturation (EPDM) in spite of the fact that these two types of rubbers are not compatible with each other.

It has now been found that it is possible to form rubbery polymerizates by graft copolymerizing, onto (A) an alpha-monoolefin copolymer type rubbery spine (preferably an EPM or EPDM type rubbery spine) one or more acrylic monomers (B) as herein described, in an amount which is sufficient to provide an optimum degree of compatibility between the rubbery alphamonoolefin type polymer and the acrylic polymer or copolymers which are formed simultaneously. The acrylic ester monomer or monomers (B) are selected in such proportions that the ester group (—COO—) content of the total copolymerizate is in the range of a minimum of 25% by weight to a maximum of 40% by weight.

Accordingly, in more detail, the invention is in one aspect directed to a mixed copolymerizate vulcanizable to an elastomeric state characterized by heat and oil resistance, comprising, by weight:

(A) a rubbery spine which is an elastomeric copolymer of ethylene with a higher alpha-monoolefin having the formula $CH_2=CHR$ wherein R is an alkyl radical having one to four carbon atoms, said rubbery spine preferably having an iodine number not greater than 20 and a Mooney viscosity ML-4 of preferably less than $100°$ at $100°$ C.;

(B) acrylic ester type monomeric material in an amount sufficient to provide an ester group (—COO—) content in the mixed copolymerizate of from 25 to 40% by weight comprising:

(a) alkyl acrylate monomeric material made up of one or more lower alkyl acrylate monomers in which the alkyl group has from 1 to 4 carbon atoms, and (b) 0 to 20 parts, per 100 parts by weight of lower alkyl acrylate (a), of a higher alkyl acrylate or methacrylate monomer in which the alkyl group has from 5 to 12 carbon atoms; and (C) 0 to 15 parts, per 100 parts by weight of rubbery spine (A), of at least one additional different ethylenically unsaturated monomer which serves to enhance the vulcanizability of the copolymerizate, the said (B) and (C) being graft copolymerized in the presence of the rubber spine (A). Examples of such modifying monomers (C) are vinyl acetate, methacrylic acid and chloroethyl vinyl ether which are remarkably effective in amounts up to 15 parts per 100 parts by weight of spine rubber (A), as well as allyl glycidyl ether which gives outstanding results in amounts of 2 to 10 parts per 100 parts by weight of (A).

The saturated or low-unsaturation alpha-monoolefin copolymer type of rubber employed as the elastomeric spine (A) in preparing the graft copolymer composition of the invention is, as indicated, ordinarily an interpolymer of ethylene with a higher alpha-monoolefin having the formula $CH_2=CHR$, in which R is an alkyl radical having from 1 to 4 carbon atoms (such as methyl, ethyl, n-propyl, isopropyl, butyl). Preferred rubbery copolymers are those in which the alpha-monoolefins used are ethylene and propylene, the weight ratio of ethylene monomer units to propylene monomer units in the copolymer frequently being from 20/80 to 80/20, preferably between 35/65 and 65/35.

As is well understood by those skilled in the art, the unsaturated types of alpha-monoolefin copolymers further include a suitable copolymerizable poly unsaturated monomer, usually a diene. Dienes suitable for use in making the rubbery copolymer are non-conjugated straightchain or cyclic diene hydrocarbons which are copolymerizable with the alpha-monoolefins. Examples of suitable diolefins are straight or branched chain diolefins, such as those in which both double bonds are terminal as in 1,4-pentadiene, 1,5-hexadiene, 2-methyl-1,5-hexadiene, 3,3-dimethyl-1,5-hexadiene, 1,7-octadiene, 1,9-decadiene, 1,19-eicosadiene, and the like and diolefins in which only one double bond is terminal such as 1,4-hexadiene, 1,9-octadecadiene, 6-methyl-1,5-heptadiene, 7-methyl-1,6-octadiene, 11-ethyl-1,11-tridecadiene and the like. Also suitable are the bridged-ring diene hydrocarbons of similar nature containing 7 tp 10 carbon atoms, especially those containing a methano or an ethano bridge, for example: (a) unsaturated derivatives of bicyclo (2.2.1) heptane containing at least two double bonds, including bycyclo (2.2.1) hepta-2,5-diene: dicyclopentadiene (also named 3a, 4, 7, 7a-tetrahydro-4,7-methanoindene), tricyclopentadiene, and tetracyclopentadiene, (b) unsaturated derivatives of bicyclo (2.2.2) octo-2,5-diene; (c) unsaturated derivatives of bicyclo (3.2.1) octane containing at least two double bonds; (d) unsaturated derivatives of bicyclo (3.3.1) nonane containing at least two double bonds; (e) unsaturated derivatives of bicyclo (3.2.2) nonane containing at least two double bonds, and the like. Dicyclopentadiene is preferred. It is also possible to use conjugated dienes to confer unsaturation on the alpha-monoolefin copolymer rubber; likewise certain monomers having hydrogen atoms which can readily be removed by free radicals, such as phenylnorbornene, are also functional equivalents of the dienes for the purpose of conferring vulcanizability on the copolymer. If a diene is used, the amount should preferably be so limited that the rubbery copolymer has an iodine number not greater than about 20; this will generally correspond to not more than about 10% by weight of diene monomer units in the rubbery spine. It is also preferred that the rubbery spine have a 212° F. Mooney viscosity (ML-4) less than 100. Preferred spine rubber has a gel content as measured in xylene at 135° C. of not more than about 40% by weight. The procedure for measuring the gel content of the raw rubbery copolymer spine is as follows: A 0.30 g sample is cut into small pieces, placed into a tea bag of 200 mesh silk fabric, suspended directly into xylene and the sample is extracted with boiling xylene for 24 hours at 135° C. At the end of the extraction period, the tea bag is removed, the solvent evaporated under a stream of nitrogen and the residue (which is the soluble portion of the sample) weighed. The percent gel is given by the expression:

$$100 - \left( \frac{\text{Weight of soluble portion}}{\text{weight of sample}} \right) = \% \text{ gel}$$

The acrylic ester type monomeric material (B) which is graft copolymerized on the rubbery spine (A) to make the mixed copolymerizate of the invention is based on monomers whose homopolymers have a relatively low glass transition temperature (Tg), that is, a Tg not greater than 6° C., as represented by one or more alkyl acrylate esters. Ordinarily the acrylic material (B) is made up of at least one lower alkyl acrylate (a) in which the alkyl group has from 1 to 4 carbon atoms and optionally from 0 to 20 parts [per 100 parts by weight of lower alkyl acrylate (a)] of a higher alkyl acrylate or methacrylate monomer (b) in which the alkyl group has from 5 to 12, preferably 5 to 8, carbon atoms. In some cases (a) is a mixture of methyl acrylate with another lower alkyl acrylate whose homopolymer has a Tg of less than 0° C.

Furthermore, the higher the proportion of acrylate used, the higher will be the oil resistance of the compounded and cured mixed copolymerizate. In this respect, methyl acrylate, at the same equivalent weight, provides the highest oil resistance of the $C_1$ to $C_4$ akyl acrylates. However, at very high proportions of methyl acrylate, the mixed copolymerizate will tend to become leather-like at room temperature. This lack of low temperature flexibility can be overcome by the inclusion of an appropriate amount of a slightly higher (i.e., $C_2$ to $C_4$) alkyl acrylate which not only supplies low temperature flexibility but also enhances oil resistance of the vulcanized mixed graft copolymerizate. It is to be noted that the oil resistance of the graft copolymer vulcanizates depend on the grafted monomer in the order of methyl acrylate > ethyl acrylate > propyl acrylate > butyl acrylate.

Thus, exemplary of the $C_1$–$C_4$ alkyl acrylates that are used singly or in admixture in monomeric component (a) are:

|  | Tg of Homopolymer, °C. |
|---|---|
| methyl acrylate | +6 |
| ethyl acrylate | −24 |
| propyl acrylate | −45 |
| n-butyl acrylate | −55 |
| sec-butyl acrylate | −20 |
| isobutyl acrylate | −43 |
| tert-butyl acrylate | −22 |

It is to be noted that in the above series of acrylates, the larger the alkyl group, the lower the resistance to oils and therefore the lower the amount of that comonomer which can ordinarily be used in order to maintain a given level of oil resistance.

Certain other acrylic-type esters may be used as the optional component (b) in minor amount, i.e., up to 20 parts or more, usually at least 2 parts, preferably 2 to 15 parts by weight per 100 parts by weight of (a) along with the aforementioned $C_1$–$C_4$ alkyl acrylates. These can be, as indicated above, $C_5$ to $C_{12}$, preferably $C_5$ to $C_8$, or higher alkyl acrylates, alkyl methacrylates, or mixtures thereof.

Exemplary of the $C_5$–$C_{12}$ or higher alkyl acrylates used in component (b) are 3-pentyl acrylate, 3-methylbutyl acrylate, 2-methylbutyl acrylate, 3-methylbutyl acrylate, 2-methylpentyl acrylate, 2-ethylbutyl acrylate, 4-methyl-2-pentyl acrylate, n-heptyl acrylate, 2-heptyl acrylate, n-octyl acrylate, 2-octyl acrylate, 2-ethylhexyl acrylate, n-nonyl acrylate, 5-ethyl-2-nonyl acrylate, and the methacrylate analogues of the aforementioned acrylates.

Ordinarily the amount of lower alkyl acrylate material (a) falls within the range of from 80 to 300 parts, while the amount of higher alkyl acrylate or methacrylate material (b) frequently falls with the range of from 0 to 20 parts, per 100 parts by weight of (A).

The grafting monomer or monomer mixture preferably further contains a minor amount, i.e., up to 15 parts or more, usually at least 2 parts, preferably 2 to 10 parts by weight [per 100 parts by weight of rubbery spine (A)], of at least one different additional ethylenically unsaturated monomer (C) which, during the grafting reaction, is believed to be incorporated into the polyacrylic side chains and functions to provide vulcanization sites for the subsequent cure of the rubbery graft copolymerizate.

Exemplary of these ethylenically unsaturated monomers (C) there may be mentioned;

(i) monomers containing a hydrogen atom in an alpha position to an aliphatic ether oxygen as exemplified by allyl glycidyl ether, vinyl ethyl ether, vinyl propyl ether, vinyl butyl ether in addition to the alkoxyalkyl acrylates such as methoxymethyl acrylate, methoxyethyl acrylate, ethoxyethyl acrylate, n-butoxyethyl acrylate, ethoxypropyl acrylate, and the like, or such monomers as acrylates containing functional groups as exemplified by glycidyl acrylate, furfuryl acrylate, tetrahydrofurfuryl acrylate, N,N-dimethylaminoethyl acrylate, N,N-diethylaminoethyl acrylate, 2-cyanoethyl acrylate, allyl acrylate and methacrylate analogues thereof.

(ii) monomers containing a hydrogen atom in an alpha position to a carbonyl group as exemplified by vinyl aceate, methyl vinyl ketone, dimethyl fumarate, diethyl fumarate, diethyl maleate, dipropyl maleate, and the like.

(iii) monomers containing a benzylic hydrogen as exemplified by benzyl acrylate, 2-phenyl ethyl acrylate and beta-phenoxyethyl acrylate;

(iv) monomers containing an active halogen, wherein the halogen may be chlorine, bromine or iodine and may be of either one of two types, namely halogen-containing vinylidene hydrocarbons or halogen-containing vinyl monomers having the halogen group at least 2 carbon atoms removed from an oxygen atom.

Exemplary of halogen-containing vinylidene hydrocarbons are allyl chloride, methallyl chloride, vinyl chloride, vinylidene chloride, vinyl benzyl chloride, vinyl benzyl bromide, 5-chloromethyl-2-norbornene, 5-bromomethyl-2-norbornene, 5-beta-chloroethyl-2-norbornene, and the like. The second type of monomer, i.e., those having the halogen group at least 2 carbon atoms removed from an oxygen atom, are characterized by having either (—O—), ketone

or ester

structures in the monomer where the halogen group is at least 2 carbon atoms and up to 6 or more carbon atoms removed from an oxygen atom. Examples of these monomers are halogen-containing vinyl esters such as vinyl chloroacetate, vinyl bromoacetate, allyl chloroacetate, vinyl 3-chloropropionate, vinyl 4-chlorobutyrate, vinyl 4-bromobutyrate, and the like: halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like: halogen-containing vinyl ethers such as 2-chloroethyl vinyl ether, halogen-containing vinyl ketones such as chloromethyl vinyl ketone, 2-chloroethyl vinyl ketone, and the like: and 5-chloroacetoxymethyl-2-norbornene, 5-(alpha, beta-dichloropropionylmethyl)-2-norbornene, and the like.

The more preferred halogen-containing monomers are vinyl benzyl chloride, 5-chloromethyl-2-norbornene, vinyl chloroacetate, 2-chloroethyl acrylate, and 5-(alpha-chloroacetoxymethyl)-2-norbornene.

Due to availability and cost, the chlorine-containing monomers are preferred.

(v) monomers containing carboxyl groups as exemplified by $C_1$–$C_5$ alkyl methacrylic acids, acrylic acid, mono $C_1$–$C_5$ alkyl esters of fumaric acid as exemplified by ethyl hydrogen maleate, methyl hydrogen fumarate, and cinnamic acid and the like.

Preferred monomers (C) for enhancing the vulcanizability of the graft copolymerizate are those selected from the group consisting of methoxyethyl acrylate, ethoxyethyl acrylate, n-butoxyethyl acrylate, butoxyethoxyethyl acrylate, glycidyl acrylate, furfuryl acrylate, tetrahydrofurfuryl acrylate, phenoxyethyl acrylate, N,N-dimethylaminoethyl acrylate, N,N-diethylaminoethyl acrylate, 2-chloroethyl acrylate, 3-chloroethyl acrylate, 2-cyanoethyl acrylate, allyl acrylate, methallyl acrylate, the methacrylate analogs of the aforementioned acrylates, allyl glycidyl ether, allyl maleate, allyl fumarate, allyl phthalate, butadiene, isoprene, 4-vinylcyclohexene, dicyclopentadiene, ethylidene norbornene, 1,4-hexadiene, 1,5-hexadiene, vinyl acetate, 2-chloroethyl vinyl ether, vinyl benzyl chloride, vinyl alpha-chloroacetate, and acrylic acid.

As stated above, the mixed copolymerizates of the invention are made by polymerizing the monomer or monomer mixture (B) and, optionally, (C), in the presence of the rubbery ethylene-propylene copolymer (A) with the result that a part of the newly-polymerized monomers of the monomeric mixture are believed to be attached to the rubber molecules. Any suitable conventional graft polymerization method may be used for making the mixed polymerizate of this invention, for example, as described in U.S. Pat. Nos. 3,489,821, Witt et al., Jan. 13, 1970; 3,489,822, Witt et al., Jan. 13, 1970; 3,642,950, O'Shea, Feb. 15, 1972 or 3,819,765, O'Shea, Jan. 25, 1974. Other methods of making the mixed copolymerizate may be used, for example, irradiation of the rubbery spine with high-energy electromagnetic or particulate radiation (gamma rays, beta rays, neutron rays, etc.) and simultaneously or subsequently contacting the rubber with the monomer or monomeric mixture.

The graft copolymer composition of the invention resulting from polymerization of the monomer or monomer mixture (B), or (B) and (C), in the presence of the alpha-monoolefin copolymer rubber spine (A) as described herein is remarkable for its good processing characteristics. It can be milled and extruded, and otherwise processed like a conventional rubber. It is most useful for making cross-linked or vulcanized articles, and for this purpose it may be compounded with various conventional rubber compounding ingredients, including fillers such as carbon black, silica, etc., vulcanizing or cross-linking agents, notably peroxides and those co-agents normally included to assist in peroxide vulcanization, plasticizers, antioxidants, etc., all in suitable conventional amounts. Vulcanization may be carried out as in ordinary practice for rubber goods, the time and temperature of vulcanization being generally inversely related and being dependent on such factors as the kind and amount of curing agent, the presence or absence of co-curing agents or activating substances, the size and shape of the article being manufactured, the character of the heating device, and other variables whose effects are well understood in the art.

Exemplary of coagents that are used to assist in the peroxide vulcanization of the mixed copolymerizates of this invention are: triallylisocyanurate, triallylcyanurate, N,N'-m-phenylene dimaleimide, ethyleneglycoldimethacrylate, 1,3-butylideneglycoldimethacrylate, trimethylolpropane trimethacrylate, trimethylolpropane triacrylate, triallylmellitate, and the like.

Conventional plasticizers or softeners may be used as one of the compounding ingredients for the mixed copolymerizates of this invention. The type of plasticizer that is used should be compatible with either the rubbery spine, the ungrafted polyacrylate or preferably both the spine and the polyacrylate. Preferably, the plasticizer should have a freezing point not higher than about 15° C. with a flash point of at least 175° C. for most applications requiring exposures to elevated temperatures for extended periods of time.

Exemplary of the plasticizers that may be used in the mixed copolymerizates of this invention are:

Paraplex G-25 (trademark; Rohm & Haas Co.), a high molecular weight polyester. Sp gr., 1.06, Viscosity at 25° C. about 2040 poises. Freezing point 13°–15° C. Acid no., 2 maximum.

Cyanacryl R (trademark; American Cyanamid), a polyethylacrylate. ML-4 at 100° C.=42-51. Sp. gr.=1.15.

Santicizer 79TM (trademark; Monsanto, Organic Rubber Division), a high molecular weight (548) trimellitate ester based on mixed $C_7$-$C_9$ alkyl essentially straight chain aliphatic alcohols, Pour point −50° C. Flash point 263° C.

Santicizer 409 (trademark; Monsanto, Organic Rubber Division), a dibasic acid and glycol polymer. Sp. gr., 1.080–1.084. Flash point (COC), 530° C. Viscosity at 25° C. 90–98 stokes. Pour point 4° C.

Santicizer 412 (trademark; Monsanto, Organic Rubber Division) a low molecular weight polyester. Pour point −50° C. Flash point 263° C.

Dioctyl adipate (Monsanto, Organic Rubber Division). Molecular weight 371. Pour point −65° C., Flash point 192° C. Sp. gr., 0.927. Viscosity at 25° C. 13.5 centipoises.

Dioctyl sebacate (Rohm & Haas). Sp. gr., 0.913±0.003. Freezing point −55° C. Flash point 212° C. Viscosity at 25° C. 27 centipoises. Saponification No. 260.

The low temperature properties of the present vulcanized graft copolymerizates are governed mainly by the Tg of the graft copolymerizate and to a lesser extent by the plasticizer. Particularly preferred plasticizers are Cyanacryl R, Paraplex G25 or Santicizer 79TM.

Antioxidants that are used in conjunction with the peroxide cure of the rubbery mixed polymerizates of this invention are the hindered phenolics and amine types of antioxidants that do not interfere with the peroxide crosslinking reaction. Exemplary of suitable antioxidants for the peroxide cure are:

2,2'-Methylene-bis(4-ethyl-6-tert-butylphenol) A0425 (trademark; American Cyanamid), 2,2-Methylene-bis(4-methyl-6-tert-butylphenol) A02246 (trademark; American Cyanamid), Tri(nonylated phenyl)phosphite-Polyguard (trademark; Uniroyal Chemical), Tetrakis methylene (3,5-di-tert-butyl-4 hydroxyhydrocinnamate) methane Irganox 1010 (trademark; Ciba Geigy), Octadecyl beta(3,5-t-butyl-4-hydroxyphenyl) propionate-Irganox 1076 (trademark; Ciba-Geigy), 1,6-Hexanediol bis 3-(3',5=-di-tert-butyl-4'-hydroxyphenyl) propionate, Irganox 259 (trademark; Ciba Geigy), Nickel diisobutyldithiocarbamate-(RT Vanderbilt), Nickel dibutyldithiocarbamate-NBC (trademark du Pont), and Poly-2,2,4-trimethyl-1,2-dihydroquinoline.

Exemplary or the peroxide-type vulcanizing agents that may be used for crosslinking the rubbery mixed copolymerizates of this invention are:

dicumyl peroxide,
1,3-bis(tert-butylperoxyisopropyl)benzene,
2,5-dimethyl-2,5(di-tert-butylperoxy)hexane,
2,5-dimethyl-2,5(di-tert-butylperoxy)hexyno-3,
n-butyl 4,4-bis(tert-butylperoxy)valerate,
di-tert-butyl peroxide,
tert-butyl perbenzoate,
2,5-dimethyl-2,5-bis(benzoylperoxy)hexane,
1,1-bis(tert-butylperoxy-3,3,5-trimethyl)cyclohexane, and
alpha, alpha'-bis(tert-butylperoxy)diisopropylbenzene.

The peroxide cure is preferred since it produces cured vulcanizates that have superior heat aging characteristics. Combined curatives such as peroxide and diamine or peroxide and sulfur are also of interest depending upon the choice of monomer which is present in minor amount. Generally, peroxide with a di- or trifunctional acrylate-type coagent leads to optimum vulcanization in which case post vulcanization is not necessary to obtain low compression set as in conventional acrylate "rubbers". Amines, e.g., methylene dianiline and hexamethylene diamine carbamate may also be employed.

Typical vulcanizates using 4 parts of Vulcup 40 KE (trademark), alpha, alpha'-bis(t-butylperoxy)diisopropylbenzene(40% on clay), and 2 parts of trimethylolpropane triacrylate per 100 parts by weight of the copolymerizate with varying fillers, have a Shore A hardness of 65-80, and a 100% modulus of 600-1100 psi; tensile strength frequently varies from 900-2000 psi and elongation-at-break varies in the 100-300% range. In many cases MT type (medium thermal) of carbon black gives the best elongation at a given peroxide level. By adjusting the peroxide level vs. coagent, one can optimize the oil swell resistance vs. the elongation over a small range.

The crosslinked or vulcanized, rubbery, mixed copolymerizates of this invention, with varying fillers, typically exhibit a volume swell of about 35 to 100% when exposed to ASTM #3 oil for 72 hours at 150° C. as measured in accordance with ASTM D-471-75. Moreover, these elastomers exhibit excellent aging of such physical properties as modulus at 100% elongation, tensile strength and elongation at break upon exposure to air for 3 days at 150° C. as measured in accordance with ASTM D-412-75 using die "C". The ranges for these aged properties are respectively modulus at 100% elongation of 730 to 1300 psi, tensile strength of 1150 to 2050 psi and elongation at break of 100 to 250%. Hot air aging causes an increase in both the modulus at 100% elongation and tensile strength and a decrease in elongation at break. Unaged Shore A hardness as measured in accordance with ASTM D-2240-75 ranges from 65 to 80 and increases to a range of 75 to 95 after being heated in air 3 days at 150° C. Low temperature flexibility (Gehman T100), as measured in accordance with ASTM D1053-73, ranges from −15° to 40° C. depending on the choice of acrylate monomers and the type of plasticizer. Compression set typically ranges from 10 to 40% after being heated in air for 22 hrs. at 300° F. as measured in accordance with ASTM D395-69, Method B. This is a very important property for gasket and seal applications, and, in this respect, this invention is capable of providing rubbers superior to commercial ethylene-methyl acrylate-acrylic acid rubbers which display about 30 to 60% compression set unless post cured.

The hardness and modulus of the vulcanizates depend strongly on the composition of the acrylate esters. For example, 100% vinyl acetate groups make a plastic while 100% of ethoxyethyl acrylate will make a soft rubber. An eminently practical polymerization recipe employs an EPDM spine/methyl acrylate/ethyl acrylate/vinyl acetate in the ratio of 100/100/80/4 or EPDM spine/methylacrylate/ethyl acrylate/ethoxyethyl acrylate/allyl glycidyl ether in the ratio of 100/50/40/8/2. The methyl acrylate/ethyl acrylate ratio is determined largely by the need to achieve a combination of good oil swell resistance and good low temperature properties. The ally glycidyl ether is believed not only to provide crosslinking sites but also to act as a mild chain transfer agent during the graft copolymerization.

Allyl glycidyl ether is particularly useful for providing softness in the graft polymer, i.e., a lower Mooney viscosity, while small amounts of vinyl acetate and ethoxyethyl acrylate are also useful for controlling hardness. Incorporation of vinyl acetate in the graft copolymer increases the modulus. In addition, vinyl acetate, ethoxyethyl acrylate and allyl glycidyl ether provide cure sites for the peroxide curing agent.

As indicated, the graft copolymerizates of the present invention are easily prepared by any one of the conventional polymerization processes including (1) bulk polymerization, (2) suspension polymerization, (3) bulk-suspension polymerization, (4) emulsion polymerization and (5) solution polymerization.

The graft copolymerizates of the invention handle well, particularly when the raw graft copolymerizate has a "B" gel content of less than about 40%, with Mooney viscosities typically in the 40-80 range (ML-4-212° F.). "B" gel as applied to the copolymerizates of this invention is measured in accordance with the following procedure: A 10 gram sample of the raw rubbery graft copolymerizates is passed 10 times through a cold, two-roll rubber mill with a clearance of 0.010". A 0.30 gram sample is cut into small pieces, and the gel measuring procedure described above for measuring the gel of the rubbery spine is carried out. The amount of "B" gel is expressed as a percentage, by weight, of the raw graft copolymerizate.

As stated above, the graft copolymerizate of the invention having a "B" gel of less than 40% handles well, that is, it processes very well in Banbury mixing and mill mixing (no sticking or bagging in all fillers tested, at various levels), and the uncured, compounded stock extrudes very smoothly in a Brabender (trademark) extruder. The results in the Brabender extrusion test correlate very well with "B" gel content of the graft copolymerizate, the extrudate becoming increasingly rougher as the "B" gel content increases above the 40% level. The green strength of the extruded stock is excellent. The processability may be said to be superior to that of conventional acrylate rubbers and the previously mentioned high temperature and high pressure copolymerizates of ethylene and methyl acrylate with small amounts of acrylic acid.

Particularly desirable products of the invention have less than 100% volume swell upon immersion in ASTM #3 oil for three days at 149° C., at least 40% retention of elongation upon exposure to a temperature of 177° C. for 3 days, less than 50% compression set without post cure and a Gehman stiffness, T100, of less than −20° C.

The following examples, in which all quantities are expressed by weight unless otherwise indicated, will serve to illustrate the practice of the invention in more detail.

EXAMPLE 1

This example demonstrates the preparation of a rubbery interpolymerizate in accordance with the concepts of the present invention, using a bulk-suspension polymerization procedure.

The EPDM #1 terpolymer rubber used is an interpolymer of ethylene, propylene and dicyclopentadiene in which the weight ratio of ethylene to propylene is 58:42, the iodine number (unsaturation level) is 5, the Mooney viscosity is 55 (ML-4 at 100° C.) and the gel content is less than 5%.

The formulation used to prepare the rubbery interpolymerizate is as follows:

|  | Grams |
|---|---|
| Distilled water | 12600.0 (840) |
| Surfactant (e.g. hydroxypropyl cellulose) | 4.5 (0.30) |
| EPDM #1 | 1500.0 (100) |
| Methyl acrylate | 750.0 (50) |
| Ethyl acrylate | 600.0 (40) |

-continued

| | Grams | |
|---|---|---|
| Ethoxyethyl acrylate | 120.0 | (8) |
| Allyl glycidyl ether | 30.0 | (2) |
| Cyclohexane | 150.0 | (10) |
| t-Butylperoxyneodecanoate | 60.0 | (2) |

A 5-gallon pressure reactor equipped with a stirrer is charged with distilled water, EPDM rubbery terpolymer, ground to a ¼ inch mesh size, surfactant and 50 percent of the reacting monomers, cyclohexane and peroxide catalyst in the order listed. The reaction mixture is warmed to 42° C. and kept at this temperature (soak temperature) while stirring for four hours (soak time) to permit the EPDM to absorb the monomer mixture. The reaction mixture is then polymerized by raising the temperature to 70° C. for four hours after which the reaction mixture is cooled to room temperature and the remaining 50 percent of the monomer mixture, cyclohexane and catalyst are added. The reaction mixture is warmed to and maintained at a temperature of 42° C. for four hours and polymerization completed at 70° C. in four hours. After cooling to room temperature, the aqueous phase is drained and the interpolymerizate washed with water and dried in a vacuum oven at 70° C. The total yield of rubbery graft interpolymerizate, excluding mechanical losses, is 98%.

Assuming that the solubility in hexane at room temperature is a measure of the substantially unmodified or ungrafted rubbery EPDM spine, and that the solubility in refluxing methyl ethyl ketone (MEK) is a measure of the polymerized but ungrafted acrylate monomer or monomers then composition of the rubbery interpolymerizate is most probably as follows:

| (a) unmodified EPDM | 16.3% | (hexane soluble) |
|---|---|---|
| (b) ungrafted acrylate polymer(s) | 42.9% | (MEK soluble) |
| (c) EPDM-acrylate graft | 40.8% | |
| Total | 100.0% | |

This particular interpolymerizate also has a "B" gel content in boiling xylene (135° C.) of 4.7%; an ester content (—COO—) of 30.8%; a Mooney viscosity (ML-4 at 100° C.) of 65. The 42.9% solubility in refluxing methyl ethyl ketone translates into a grafting efficiency of 35.6%.

The interpolymerizate is evaluated for physical properties, oil resistance and low temperature flexibility in the following vulcanization formula:

| | Parts |
|---|---|
| Interpolymerizate of Example 1 | 100.0 |
| Semi-reinforcing block | 40.0 |
| Medium-thermal black | 40.0 |
| Cyanacryl R | 10.0 |
| Paraplex G-25 | 5.0 |
| Polymerized 1,2-dihydro-2,2,4-trimethylquinoline | 1.0 |
| Hypalon 40 | 2.0 |
| Sb₂O₃ | 2.0 |
| Trimethylolpropane triacrylate | 2.0 |
| 2,2'-bis(t-butylperoxydiisopropyl)benzene | 4.0 |

Hypalon 40 (trademark) is chlorosulfonated polyethylene; sp. gr. 1.18; Mooney viscosity 55 ML-4 at 212° F., chlorine 35%; sulfur 1.0%.

The above vulcanizable formulation is prepared in two steps as follows:

STEP 1

Using an 8-lb. capacity Shaw (trademark) internal mixer (Shaw Company), operating at 50 rpm with no heat, a masterbatch is made consisting of the interpolymerizate, carbon black, plasticizers and antioxidant according to the following schedule:

| Minutes | |
|---|---|
| 0 | rubbers loaded |
| 1 | ½ black and plasticizers added |
| 2 | ½ black and anti-oxidant added |
| 7 | mixture dumped at 137° C. |

STEP 2

Using a conventional rubber mill operating at 150° to 170° F., the remaining ingredients, chlorosulfonated polyethylene, antimony trioxide, trimethylol propane triacrylate and the peroxide are added in that order.

The formulation is then vulcanized by compression molding in a closed mold under a pressure of 1000 psi at 170° C. for 30 minutes.

Vulcanizate properties are determined using the following ASTM test procedures:

| Shore (A) hardness | (ASTM D-2240-75) |
|---|---|
| Tensile strength, psi | (ASTM D-412-75) |
| 100% modulus, psi | (ASTM D-412-75) |
| 200% modulus, psi | (ASTM D-412-75) |
| Elongation, % | (ASTM D-412-75) |
| Stiffness (Torsional modulus-Gehman T10 and T100) | (ASTM D-1053-73) |
| Volume Swell, %, #3 oil | (ASTM D-471-75), 72 hours at 300° F. |
| Compression set, % | (ASTM D-395-69); Method B: 22 hours at 300° F. |

The physical properties of the vulcanizate are as follows:

| | Unaged | After aging 72 hrs. at 350° F. |
|---|---|---|
| Tensile strength, psi | 1200 | 1890 |
| 100% modulus, psi | 570 | 1290 |
| 200% modulus, psi | 1200 | — |
| Elongation, % | 200 | 140 |
| Hardness, Shore "A" | 63 | 81 |
| Stiffness (Gehman) °C. | | |
| T10 | −14.5 | — |
| T100 | −35.0 | — |
| Compression set after 22 hrs. at 300° F., % | 30 | — |
| Volume swell, %, (after 3 days at 300° F. in #3 oil | 64 | — |

As indicated above, the volume swell in ASTM #3 oil after three days at 300° F. of the peroxide cured copolymerizate is well below 100%. In general, heat aging after 72 hours at 350° F. causes an increase in the tensile strength, the modulus at 100% elongation, Shore "A" hardness and a decrease in the elongation at break. This excellent resistance to heat aging, high resistance to oil and low compression set makes this vulcanizate a candidate for such application as high performance seals, "O" rings and under the hood of automobiles.

EXAMPLE 2

A series of rubbery graft copolymerizates is made to demonstrate the effect of the ester (—COO—) content on the volume swell in ASTM#3 oil of compounded, cured graft copolymerizates. The essential features of the preparations, including the polymerization formulas, are shown in Table I, Part A, B, C and D below (following these examples). Runs 1, 2 and 3 are carried out in 600 ml soda bottles, runs 5, 9, 12, 13 and 14 are carried out in 5 gallon reactors, runs 4, 6, 7, 8, 10 and 15 are made in 10 gallon reactors, while run 11 is made in a 150 gallon reactor. With the exception of runs 1, 2, 3 and 15, all the graft copolymerizates are made using the two-step bulk-suspension polymerization procedure of Example 1. Runs 1, 2 and 3 are made by a one-step bulk-suspension procedure in which the listed ingredients are distributed equally among each of three 600 ml soda bottles, capped and tumbled in a water bath for the indicated times and temperatures. Run 15 is made in a 10 gallon reactor by a one-step bulk-suspension procedure, all the ingredients being added to the reactor in the order listed. EPDM #1 is an ethylene-propylene-dicyclopentadiene elastomer having an ethylene/propylene ratio of 68/42, a Mooney viscosity (ML-4-212° F.) of 55, and an iodine number of 5. EPDM #2 is a similar dicyclopentadiene terpolymer, having an E/P ratio of 52/48, a Mooney of 60 and an iodine number of 10. Runs 5–15 additionally contain 0.2 part by weight of sodium nitrite per 100 parts by weight of EPDM. In Table I, Methocel K4M (trademark) is hydroxypropyl methylcellulose, mol. wt. 56,000. Methocel K100 (trademark) is hydroxypropyl methylcellulose, mol. wt. 26,000. Lupersol 10 (trademark) is 75% t-butylperoxyneodecanoate in mineral spirits. Lupersol 11 (trademark) is 75% t-butylperoxypivalate in mineral spirits. MEK stands for methyl ethyl ketone. The amounts of materials in Table I are expressed in parts by weight. The various graft copolymerizates obtained according to the formulas in Table I are subsequently compounded for vulcanization according to the recipes set forth in Table II, Parts A, B, C and D where the Run numbers refer to the corresponding products from Table I. The quantities of ingredients are expressed in Table II in parts by weight. The designations for the carbon black have the following meanings: SRF is semi-reinforcing furnace, MF is medium thermal, and HAF is high abrasion furnace. Naugard Q (trademark) is polymerized 1,2-dihydro-2,2,4-trimethylquinoline. Agerite Resin D (trademark) is poly 2,2,4-trimethyl-1,2-dihydroquinoline. SR351 (Sartomer; trademark) is trimethylolpropane triacrylate. SR500 (Sartomer; trademark) is 90% trimethylolpropane trimethacrylate containing inhibitor (e.g., N-nitroso diphenylamine). SR515 (Sartomer; trademark) is 90% trimethylolpropane trimethacrylate plus nitroso acrylamine inhibitor. Polyethylene AC617 (trademark) is polyethylene homopolymer processing aid. Samples of the compounded elastomers are press cured under the conditions indicated in Table II, and thereafter physical tests on unaged and aged specimens are undertaken, with the results indicated in Table III, Parts A, B, C and D were like run numbers indicate like materials.

An examination of the oil swell data in Table III shows an inverse correlation with the ester (—COO—) content of the graft copolymerizate. This relationship can be described by the following quadratic equation:

$$\% \text{ Oil Swell} = 278.9 - 8.89 \, (\% \text{ Ester}) + 0.068 \, (\% \text{ Ester})^2.$$

The correlation coefficient of this relationship is 0.976 signifying that 95% of the variation in % swell is explained by this function of ester content, independent of the curing system used and the size of the reactor.

It is also apparent that the larger the alkyl group of the acrylic ester (Runs 4, 2 and 1) the higher the percent swell in ASTM 190 3 oil, which increases from 97% for methyl acrylate to 138% for butyl acrylate.

The maximum useful range of ester content of the graft copolymerizates of this invention is 25% to 40%. However, the preferred ester range is 28% to 35% and the most preferred ester range is 30% to 35%. It is to be noted that while it is desirable to have as much ester content as possible in order to get low volume swell in oil there is a limit how high this can be with respect to the low temperature flexibility which is dependent on the amount of the EPM or EPDM spine rubber. Therefore, the above indicated most preferred range of ester content represents a compromise between oil swell and low temperature flexibility. Runs 1, 2 and 3, having a low ester content and oil swell above 100%, are outside the invention. Run 15 is a blank or control to demonstrate the maximum oil resistance attainable with a polyacrylic rubber.

EXAMPLE 3

A series of graft copolymerizates is made using the procedure of Example 1 in which the amounts of methyl acrylate are varied from 0 to 140 parts by weight per 100 parts by weight of the EPDM spine rubber used in Example 1. Simultaneously, the amount of ethyl acrylate is varied from a minimum of 88 parts by weight to 280 parts by weight per 100 parts by weight of EPDM spine rubber. Included in this series are graft copolymers made using a minor amount of ethylenically unsaturated monomers for the specific purpose of providing crosslinking sites for curing the compounded graft copolymerizates. The polymerization formulas are set forth in Table IV, Parts A, B, C and D, in parts by weight, wherein Runs 16–32 contain 0.2 part by weight of sodium nitrite per 100 parts by weight of EPDM elastomer. Runs 16, 17, 18 and 19 employ one stage loading of ingredients; all other runs use the procedure of Example 1. The graft polymerizates are compounded for vulcanization according to the recipes shown in Table V, Parts A, B, C and D, wherein C-50 (trademark) is sodium 2-ethyl hexanoate. Properties of the vulcanizates are shown in Table VI, Parts A, B, C and D. Runs 19, 23, 24 and 31 yield products having more than 40% "B" gel and are more difficult to process, but still have utility.

TABLE I

| Part A Example 2 Graft Copolymerization Formulas | | | | |
|---|---|---|---|---|
| Run: | 1 | 2 | 3 | 4 |
| Water | 600 | 600 | 600 | 800 |
| Cyclohexane | — | — | — | 20 |
| Toluene | — | — | — | — |
| Methocel K4M | 0.20 | 0.20 | 0.20 | 0.2 |
| Methocel K100 | — | — | — | — |
| EPDM #1 | — | — | — | 100 |
| EPDM #2 | 100 | 100 | 100 | — |
| Methyl Acrylate | — | 50 | — | 100 |
| Ethyl Acrylate | — | — | 100 | — |
| Butyl Acrylate | 100 | 50 | — | — |

TABLE I-continued

Part A (continued)

| | | | | |
|---|---|---|---|---|
| Ethoxyethyl Acrylate | — | — | — | — |
| Allyl Glycidyl Ether | — | — | — | 4.0 |
| Lupersol 10 | — | — | — | — |
| Lupersol 11 | 4.0 | 4.0 | 4.0 | 4.0 |
| Irganox 1076 | 1.0 | 2.0 | 1.0 | — |
| Temp. of Soak, °C. | 40 | 40 | 40 | 40 |
| Time of Soak, Hours | 16 | 18 | 16 | 9 |
| Poly'n Temp.; °C. | 90 | 90 | 90 | 70 |
| Poly'n Time; Hours | 3 | 3 | 3 | 13.5 |
| Yield; % | 97.1 | 99.0 | 97.3 | 99.5 |
| % Hexane Soluble | — | — | — | 25 |
| % MEK Soluble | 9.8 | 23.1 | 37.5 | 30.0 |
| % "B" Gel | — | — | — | 7.3 |
| Grafting Efficiency, % | 79.3 | 53.2 | 22.5 | 41.2 |

Part B

| | 5 | 6 | 7 | 8 |
|---|---|---|---|---|
| Water | 900 | 900 | 900 | 900 |
| Cyclohexane | 20 | — | 40 | 40 |
| Toluene | — | 40 | — | — |
| Methocel K4M | .20 | 0.10 | 0.10 | — |
| Methocel K100 | — | — | — | 0.10 |
| EPDM #1 | 100 | 100 | 100 | 100 |
| EPDM #2 | — | — | — | — |
| Methyl Acrylate | 100 | 100 | 100 | 100 |
| Ethyl Acrylate | 30 | 88 | 88 | 88 |
| Butyl Acrylate | — | — | — | — |
| Ethoxyethyl Acrylate | 30 | 8.0 | 8.0 | 8.0 |
| Allyl Glycidyl Ether | 4.0 | 4.0 | 4.0 | 4.0 |
| Lupersol 10 | 14.0 | 12.0 | 12.0 | 12.0 |
| Lupersol 11 | — | — | — | — |
| Irganox 1076 | — | 0.50 | 0.50 | 0.50 |
| Temp. of Soak, °C. | 40 | 42 | 42 | 42 |
| Time of Soak, Hours | 9 | 9 | 9 | 9 |
| Poly'n Temp.; °C. | 70 | 70 | 70 | 70 |
| Poly'n Time; Hours | 13.5 | 13.5 | 13.5 | 13.5 |
| Yield; % | 99.6 | 94.8 | .96 | 97.6 |
| % Hexane Soluble | 12.9 | 16.1 | 16.0 | 16.1 |
| % MEK Soluble | 31.0 | 40.7 | 43.7 | 42.7 |
| % "B" Gel | 39.9 | 26.1 | 21.9 | 34.3 |
| Grafting Efficiency, % | 50.1 | 39.0 | 34.5 | 36.0 |

Part C

| | 9 | 10 | 11 | 12 |
|---|---|---|---|---|
| Water | 840 | 900 | 900 | 900 |
| Cyclohexane | 20 | 40 | 40 | 20 |
| Toluene | — | — | — | — |
| Methocel K4M | 0.30 | — | — | — |
| Methocel K100 | — | 0.10 | 0.10 | 0.15 |
| EPDM #1 | 100 | 100 | 100 | 100 |
| EPDM #2 | — | — | — | — |
| Methyl Acrylate | 100 | 120 | 120 | 160 |
| Ethyl Acrylate | 80 | 88 | 88 | 128 |
| Butyl Acrylate | — | — | — | — |
| Ethoxyethyl Acrylate | 8.0 | 8.0 | 8.0 | 12.0 |
| Allyl Glycidyl Ether | 4.0 | 4.0 | 4.0 | — |
| Lupersol 10 | 8.0 | 12.0 | 12.0 | 12.0 |
| Lupersol 11 | — | — | — | — |
| Irganox 1076 | — | 0.50 | 0.50 | — |
| Temp. of Soak, °C. | 40 | 42 | 42 | 42 |
| Time of Soak, Hours | 9 | 9 | 9 | 9 |
| Poly'n Temp.; °C. | 70 | 70 | 70 | 70 |
| Poly'n Time; Hours | 13.5 | 13.5 | 13.5 | 13.5 |
| Yield; % | 98.2 | 98.1 | 99.5 | 95.8 |
| % Hexane Soluble | 16.3 | 15.4 | 12.1 | 10.2 |
| % MEK Soluble | 42.9 | 44.3 | 45.2 | 32.5 |
| % "B" Gel | 4.7 | 36.8 | 39.8 | 41.9 |
| Grafting Efficiency, % | 34.7 | 35.5 | 34.3 | 56.7 |

Part D

| | 13 | 14 | 15 |
|---|---|---|---|
| Water | 900 | 900 | 900 |
| Cyclohexane | 20 | 20 | 22 |
| Toluene | — | — | — |
| Methocel K4M | 0.15 | 0.15 | 0.30 |
| Methocel K100 | — | — | — |
| EPDM #1 | 100 | 100 | — |
| EPDM #2 | — | — | — |
| Methyl Acrylate | 160 | 220 | 100 |
| Ethyl Acrylate | 128 | 68 | 88 |
| Butyl Acrylate | — | — | — |
| Ethoxyethyl Acrylate | 12.0 | 12.0 | 8.0 |
| Allyl Glycidyl Ether | 6.0 | — | 4.0 |
| Lupersol 10 | 12.0 | 12.0 | 8.0 |
| Lupersol 11 | — | — | — |
| Irganox 1076 | — | — | — |
| Temp. of Soak, °C. | 42 | 42 | 42 |
| Time of Soak, Hours | 9 | 9 | 9 |
| Poly'n Temp.; °C. | 70 | 70 | 70 |
| Poly'n Time; Hours | 13.5 | 13.5 | 13.5 |
| Yield; % | 99.0 | 99.1 | — |
| % Hexane Soluble | 10.1 | 12.7 | — |
| % MEK Soluble | 50.1 | 29.0 | 96.4 |
| % "B" Gel | 18.7 | 26.2 | 0 |
| Grafting Efficiency, % | 33.5 | 28.0 | — |

TABLE II

Part A
Example 2 Compound Recipes

| Run: Compounding | 1 | 2 | 3 | 4 |
|---|---|---|---|---|
| Graft Interpolymer | 100 | 100 | 100 | 100 |
| SRF Carbon Black | — | — | — | 80 |
| MT Carbon Black | — | — | — | — |
| HAF Carbon Black | 50 | 50 | 50 | — |
| Paraplex G-25 | — | — | — | 10 |
| Cyanacryl R | — | — | — | 20 |
| Naugard Q | — | — | — | 1.0 |
| Agerite Resin D | 0.5 | 0.5 | 0.5 | — |
| NBC | — | — | — | — |
| SR 351 | — | — | — | — |
| SR 500 | — | — | — | — |
| SR 515 | — | — | — | 1.5 |
| Hypalon 40 | — | — | — | 5.0 |
| Polyethylene AC 617 | 2.0 | 2.0 | 2.0 | — |
| Zinc Oxide | 5.0 | 5.0 | 5.0 | — |
| Antimony Trioxide | — | — | — | 5.0 |
| Vulcup 40 KE | — | — | — | 5.0 |
| Dicumyl Peroxide | 2.0 | 2.0 | 2.0 | 5.0 |
| CURE | | | | |
| Temp. °C. | 170 | 170 | 170 | 170 |
| Time, Mins. | 20 | 20 | 20 | 30 |

| Compounding | 5 | 6 | 7 | 8 |
|---|---|---|---|---|
| Graft Interpolymer | 100 | 100 | 100 | 100 |
| SRF Carbon Black | 80 | 80 | 80 | 80 |
| MT Carbon Black | — | — | — | — |
| HAF Carbon Black | — | — | — | — |
| Paraplex G-25 | 10 | 10 | 10 | 10 |
| Cyanacryl R | — | — | — | — |
| Naugard Q | 1.0 | 1.5 | 1.5 | 1.5 |
| Agerite Resin D | — | — | — | — |
| NBC | — | 1.7 | 1.7 | 1.7 |
| SR 351 | — | 2.0 | 2.0 | 2.0 |
| SR 500 | — | 1.5 | — | — |
| SR 515 | — | 1.5 | — | — |
| Hypalon 40 | 5.0 | — | — | — |
| Polyethylene AC 617 | — | — | — | — |
| Zinc Oxide | — | — | — | — |
| Antimony Trioxide | 5.0 | — | — | — |
| Vulcup 40 KE | 6.0 | 4.0 | 4.0 | 4.0 |
| Dicumyl Peroxide | 6.0 | 4.0 | 4.0 | 4.0 |
| CURE | | | | |
| Temp. °C. | 170 | 170 | 170 | 170 |
| Time, Mins. | 30 | 30 | 30 | 30 |

| Compounding | 9 | 10 | 11 | 12 |
|---|---|---|---|---|
| Graft Interpolymer | 100 | 100 | 100 | 100 |
| SRF Carbon Black | — | 80 | 80 | 80 |
| MT Carbon Black | 80 | — | — | — |
| HAF Carbon Black | — | — | — | — |
| Paraplex G-25 | 5 | 10 | 5.0 | 10 |
| Cyanacryl R | 10 | — | — | — |
| Naugard Q | 1.0 | 1.5 | 2.0 | 2.0 |
| Agerite Resin D | — | — | — | — |
| NBC | 2.0 | 1.7 | — | — |
| SR 351 | 2.0 | 2.0 | 2.0 | 2.0 |
| SR 500 | — | — | — | — |
| SR 515 | — | — | — | — |
| Hypalon 40 | 2.0 | 2.0 | — | — |

TABLE II-continued

| | | | | |
|---|---|---|---|---|
| Polyethylene AC 617 | — | — | — | — |
| Zinc Oxide | — | — | — | — |
| Antimony Trioxide | 2.0 | — | — | — |
| Vulcup 40 KE | 4.0 | 4.0 | 3.0 | 3.0 |
| Dicumyl Peroxide | 4.0 | 4.0 | 3.0 | 3.0 |
| CURE | | | | |
| Temp, °C. | 170 | 170 | 170 | 170 |
| Time, Mins. | 30 | 30 | 30 | 30 |

| Compounding | 13 | 14 | 15 |
|---|---|---|---|
| Graft Interpolymer | 100 | 100 | 100 |
| SRF Carbon Black | 80 | 80 | 80 |
| MT Carbon Black | — | — | — |
| HAF Carbon Black | — | — | — |
| Paraplex G-25 | 10 | 10 | 10 |
| Cyanacryl R | — | — | — |
| Naugard Q | 2.0 | 2.0 | — |
| Agerite Resin D | — | 1.5 | 1.5 |
| NBC | — | — | 1.7 |
| SR 351 | 2.0 | 2.0 | 2.0 |
| SR 500 | — | — | — |
| SR 515 | — | — | — |
| Hypalon 40 | — | — | — |
| Polyethylene AC 617 | — | — | — |
| Zinc Oxide | — | — | — |
| Antimony Trioxide | — | — | — |
| Vulcup 40 KE | 3.0 | 3.0 | 4.0 |
| Dicumyl Peroxide | 3.0 | 3.0 | 4.0 |
| CURE | | | |
| Temp, °C. | 170 | 170 | 170 |
| Time, Mins. | 30 | 30 | 30 |

TABLE III

Part A
Example 2 Vulcanizate Properties

| Physical Properties | Run: 1 | 2 | 3 | 4 |
|---|---|---|---|---|
| Unaged | | | | |
| Tensile, psi | 2100 | 1860 | 1330 | 2250 |
| 100% Modulus, psi | 400 | 220 | 290 | 1379 |
| % Elongation | 300 | 270 | 290 | 170 |
| Hardness, Shore A | 79 | 67 | 65 | 79 |
| Gehman, T100 °C. | −40 | −39 | −43 | — |
| Aged, 72 Hrs. @ 350° F. | | | | |
| Tensile, psi | 2130 | 1830 | 1380 | 2670 |
| 100% Modulus, psi | — | 340 | — | — |
| % Elongation @ Break | 290 | 270 | 290 | 80 |
| Hardness, Shore A | 85 | 70 | 66 | 90 |
| Compression Set after 22 Hours @ 300° F. | — | — | — | 40 |
| % Swell, ASTM #3 oil after 72 hrs. @ 300° F. | 138 | 131 | 125 | 97 |
| % Ester (—COO) in Graft Interpolymer | 17.0 | 21.4 | 22.0 | 25.2 |

| Physical Properties | 5 | 6 | 7 | 8 |
|---|---|---|---|---|
| Unaged | | | | |
| Tensile, psi | 1670 | 1240 | 1110 | 1680 |
| 100% Modulus, psi | 970 | 620 | 590 | 750 |
| % Elongation | 180 | 200 | 210 | 230 |
| Hardness, Shore A | 69 | 72 | 69 | 82 |
| Gehman, T100 °C. | — | −25 | −27 | −30 |
| Aged, 72 Hrs. @ 350° F. | | | | |
| Tensile psi | 1650 | 450 | 1240 | 2050 |
| 100% Modulus, psi | — | 900 | 880 | 1980 |
| % Elongation @ Break | 30 | 177 | 153 | 120 |
| Hardness, Shore A | 87 | 82 | 81 | 95 |
| Compression Set after 22 hours @ 300° F. | — | 17.6 | 22.7 | 29.3 |
| % Swell, ASTM #3 oil after 72 hrs. @ 300° F. | 73 | 78 | 80 | 69 |
| % Ester (—COO) in Graft Interpolymer | 28.3 | 29.2 | 29.6 | 30.1 |

| Physical Properties | 9 | 10 | 11 | 12 |
|---|---|---|---|---|
| Unaged | | | | |
| Tensile, psi | 1110 | 1160 | 1140 | 970 |
| 100% Modulus, psi | 470 | 640 | 720 | 560 |
| % Elongation | 240 | 200 | 200 | 250 |
| Hardness, Shore A | 58 | 66 | 77 | 72 |
| Gehman, T100 °C. | −32 | −30 | −22 | −29 |
| Aged, 72 Hrs. @ 350° F. | | | | |
| Tensile, psi | 1500 | 1730 | 1500 | 1170 |
| 100% Modulus, psi | 870 | 1260 | 1190 | 730 |
| % Elongation @ Break | 150 | 160 | 150 | 230 |
| Hardness, Shore A | 72 | 82 | 90 | 76 |
| Compression Set after 22 hours @ 300° F. | 30 | 30.2 | 28.0 | 23.6 |
| % Swell, ASTM #3 oil after 72 hrs. @ 300° F. | 55 | 72 | 61 | 59 |
| % Ester (—COO) in Graft Interpolymer | 30.8 | 31.5 | 31.8 | 33.2 |

| Physical Properties | 13 | 14 | 15 |
|---|---|---|---|
| Unaged | | | |
| Tensile, psi | 970 | 1240 | 290 |
| 100% Modulus, psi | 650 | 640 | 190 |
| % Elongation | 220 | 240 | 850 |
| Hardness, Shore A | 73 | 78 | 67 |
| Gehman, T100 °C. | −32 | −28 | −21 |
| Aged, 72 Hrs. @ 350° F. | | | |
| Tensile, psi | 1500 | 1420 | 1240 |
| 100% Modulus, psi | 990 | 950 | 880 |
| % Elongation @ Break | 170 | 200 | 240 |
| Hardness, Shore A | 86 | 88 | 84 |
| Compression Set after 22 hours @ 300° F. | 35.2 | 25.6 | 90.8 |
| % Swell, ASTM #3 oil after 72 hrs. @ 300° F. | 55 | 57 | 13 |
| % Ester (—COO) in Graft Interpolymer | 34 | 35.7 | 46.2 |

TABLE IV

Part A
Example 3 Graft Copolymerization Formulas

| | Run: 16 | 17 | 18 | 19 | 20 |
|---|---|---|---|---|---|
| Water | 900 | 900 | 900 | 900 | 900 |
| Cyclohexane | 40 | 40 | 40 | 40 | 40 |
| Methocel K4M | — | — | — | — | — |
| Methocel K100 | 0.1 | 0.2 | 0.2 | 0.1 | 0.1 |
| EPDM #1 | 100 | 100 | 100 | 100 | 100 |
| Methyl Acrylate | 120 | 120 | 120 | 120 | 120 |
| Ethyl Acrylate | 88 | 88 | 88 | 88 | 88 |
| Ethoxy ethyl Acrylate | 8 | — | — | 8 | 8 |
| Allyl Glycidyl Ether | 4 | — | 4 | — | 4 |
| Vinyl Acetate | — | — | — | — | — |
| Vinylidene Chloride | — | — | — | — | — |
| Methacrylic Acid | — | — | — | — | — |
| 2-Chloroethyl Vinyl Ether | — | — | — | — | — |
| Lupersol 10 | 6 | 6 | 6 | 6 | 12 |
| Irganox 1076 | 0.5 | 0.5 | 0.5 | 0.5 | 0.5 |
| Temp. of Soak, °F. | 108 | 108 | 108 | 108 | 108 |
| Time of Soak, Hours | 9 | 9 | 9 | 9 | 9 |
| Polymerization Temp. °C. | 158 | 158 | 158 | 158 | 158 |
| Polymerization Time, Hrs. | 14 | 14 | 14 | 14 | 14 |
| Yield,% | 99.0 | 99.0 | 99.6 | 99.0 | 98.7 |
| % Hexane Soluble | 10.4 | 7.9 | 10.9 | 2.5 | 13.3 |
| % MEK Soluble | 61.6 | 59.7 | 59.7 | 54.9 | 40.4 |
| % "B" Gel | 7.3 | 31.9 | 31.8 | 41.9 | 26.5 |
| Grafting Efficiency,% | 10.4 | 11.6 | 12.1 | 19.7 | 39.4 |

Part B

| | 21 | 22 | 23 | 24 |
|---|---|---|---|---|
| Water | 450 | 450 | 450 | 450 |
| Cyclohexane | 20 | 20 | 20 | 20 |
| Methocel K4M | 0.15 | 0.15 | 0.15 | 0.15 |
| Methocel K100 | — | — | — | — |
| EPDM #1 | 100 | 100 | 100 | 100 |
| Methyl Acrylate | 100 | 100 | 100 | 100 |
| Ethyl Acrylate | 88 | 80 | 80 | 80 |

TABLE IV-continued

| | | | | |
|---|---|---|---|---|
| Ethoxyethyl Acrylate | — | — | 8 | — |
| Allyl Glycidyl Ether | — | — | — | — |
| Vinyl Acetate | — | — | — | 8 |
| Vinylidene Chloride | — | — | — | — |
| Methacrylic Acid | — | — | — | — |
| 2-Chloroethyl Vinyl Ether | — | — | — | — |
| Lupersol 10 | 12 | 12 | 12 | 12 |
| Irganox 1076 | — | — | — | — |
| Temp. of Soak, °F. | 108 | 108 | 108 | 108 |
| Time of Soak, Hrs. | 9 | 9 | 9 | 9 |
| Polymerization Temp. °C. | 158 | 158 | 158 | 158 |
| Polymerization Time, Hrs. | 14 | 14 | 14 | 14 |
| Yield % | 98.1 | 98.8 | 98.1 | 99.5 |
| % Hexane Soluble | 11.4 | 14.6 | 13.4 | 13.5 |
| % MEK Soluble | 32.1 | 28.0 | 26.5 | 31.3 |
| % "B" Gel | 27.9 | 18.9 | 53.7 | 43.5 |
| Grafting Efficiency, % | 50.8 | 56.4 | 59.4 | 52.0 |

Part C

| | 25 | 26 | 27 | 28 |
|---|---|---|---|---|
| Water | 450 | 900 | 900 | 900 |
| Cyclohexane | 20 | 40 | 40 | 40 |
| Methocel K4M | 0.15 | — | — | — |
| Methocel K100 | — | 0.1 | 0.1 | 0.30 |
| EPDM #1 | 100 | 100 | 100 | 100 |
| Methyl Acrylate | 100 | 140 | 100 | — |
| Ethyl Acrylate | 80 | 88 | 136 | 280 |
| Ethoxyethyl Acrylate | — | 8 | 8 | 8 |
| Allyl Glycidyl Ether | 4 | 4 | 4 | 4 |
| Vinyl Acetate | — | — | — | — |
| Vinylidene Chloride | — | — | — | — |
| Methacrylic Acid | — | — | — | — |
| 2-Chloroethyl Vinyl Ether | — | — | — | — |
| Lupersol 10 | 12 | 12 | 12 | 12 |
| Irganox 1076 | — | 0.5 | 0.5 | 0.5 |
| Temp. of Soak, °F. | 108 | 108 | 108 | 108 |
| Time of Soak, Hours | 9 | 9 | 9 | 9 |
| Polymerization Temp. °C. | 158 | 158 | 158 | 158 |
| Polymerization Time, Hrs. | 14 | 14 | 14 | 14 |
| Yield, % | 97.9 | 99.6 | 98.6 | 95.9 |
| % Hexane Soluble | 12.4 | 13.0 | 13.5 | 10.7 |
| % MEK Soluble | 40.1 | 52.3 | 56.3 | 44.6 |
| % "B" Gel | 3.8 | 8.9 | 13.9 | 8.0 |
| Grafting Efficiency, % | 38.1 | 25.9 | 21.0 | 40.1 |

Part D

| | 29 | 30 | 31 | 32 |
|---|---|---|---|---|
| Water | 900 | 900 | 900 | 900 |
| Cyclohexane | 40 | 40 | 40 | 40 |
| Methocel K4M | — | — | — | — |
| Methocel K100 | 0.1 | 0.1 | 0.1 | 0.1 |
| EPDM #1 | 100 | 100 | 100 | 100 |
| Methyl Acrylate | 120 | 120 | 120 | 120 |
| Ethyl Acrylate | 88 | 88 | 88 | 88 |
| Ethoxyethyl Acrylate | 8 | 8 | 8 | 8 |
| Allyl Glycidyl Ether | 4 | 4 | 4 | 16 |
| Vinyl Acetate | — | — | — | — |
| Vinylidene Chloride | 4 | — | — | — |
| Methacrylic Acid | — | 12 | — | — |
| 2-Chloroethyl Vinyl Ether | — | — | 12 | — |
| Lupersol 10 | 12 | 12 | 12 | 12 |
| Irganox 1076 | 0.5 | 0.5 | 0.5 | 0.5 |
| Temp. of Soak, °F. | 108 | 108 | 108 | 108 |
| Time of Soak, Hours | 9 | 9 | 9 | 9 |
| Polymerization Temp. °C. | 158 | 158 | 158 | 158 |
| Polymerization Time, Hrs. | 14 | 14 | 14 | 14 |
| Yield, % | 99 | 98.8 | 98.0 | 97.6 |
| % Hexane Soluble | 14.3 | 14.3 | 11.9 | 11.2 |
| % MEK Soluble | 57.3 | 33.0 | 57.9 | 61.6 |
| % "B" Gel | 4.4 | 28.3 | 44.8 | 12.8 |
| Grafting Efficiency, % | 17.1 | 52.8 | 17.2 | 11.9 |

TABLE V

Part A
Example 3 Compound Recipes

| Compounding | 16 | 17 | 18 | 19 | 20 |
|---|---|---|---|---|---|
| Graft Copolymer | 100 | 100 | 100 | 100 | 100 |
| SRF Black | 80 | 80 | 80 | 80 | 40 |
| MT Black | — | — | — | — | 40 |
| Paraplex G-25 | 5.0 | 5.0 | 5.0 | 5.0 | 5 |
| Naugard Q | 2.0 | 2.0 | 2.0 | 1.0 | — |
| SR 351 | 2.0 | 2.0 | 2.0 | 2.0 | 2.0 |
| Vulcup 40 KE | 3.0 | 3.0 | 3.0 | 3 | 5.0 |
| Spider Sulfur | — | — | — | — | — |
| C-50 | — | — | — | — | — |
| Cure | | | | | |
| Temp., °F. | 340 | 340 | 340 | 340 | 340 |
| Time, Mins. | 30 | 30 | 30 | 30 | 30 |

| Compounding | 21 | 22 | 23 | 24 |
|---|---|---|---|---|
| Graft Copolymer | 100 | 100 | 100 | 100 |
| SRF Black | 80 | 80 | 80 | 80 |
| MT Black | — | — | — | — |
| Paraplex G-25 | 10 | 10 | 10 | 10 |
| Naugard Q | 2.0 | 2.0 | 2.0 | 2.0 |
| SR 351 | 2.0 | 2.0 | 2.0 | 2.0 |
| Vulcup 40 KE | 3.0 | 3.0 | 3.0 | 3.0 |
| Spider Sulfur | — | — | — | — |
| C-50 | — | — | — | — |
| Cure | | | | |
| Temp. °F. | 340 | 340 | 340 | 340 |
| Time, Mins. | 30 | 30 | 30 | 30 |

| Compounding | 25 | 26 | 27 | 28 |
|---|---|---|---|---|
| Graft Copolymer | 100 | 100 | 100 | 100 |
| SRF Black | 80 | 80 | 80 | 80 |
| MT Black | — | — | — | — |
| Paraplex G-25 | 10 | 15 | 10 | 5 |
| Naugard Q | 2.0 | 2.0 | 2.0 | 2.0 |
| SR 351 | 2.0 | 2.0 | 2.0 | 2.0 |
| Vulcup 40 KE | 3.0 | 3.5 | 3.0 | 3.0 |
| Spider Sulfur | — | — | — | — |
| C-50 | — | — | — | — |
| Cure | | | | |
| Temp., °F. | 340 | 340 | 340 | 340 |
| Time, Mins. | 30 | 30 | 30 | 30 |

| Compounding | 29 | 30 | 31 | 32 |
|---|---|---|---|---|
| Graft Copolymer | 100 | 100 | 100 | 100 |
| SRF Black | 80 | 80 | 80 | 80 |
| MT Black | — | — | — | — |
| Paraplex G-25 | 10 | 5 | 5 | 5 |
| Naugard Q | 2.0 | 2.0 | 2.0 | 2.0 |
| SR 351 | 2.0 | 2.0 | — | 2.0 |
| Vulcup 40 KE | 3.0 | 3.0 | — | 3.0 |
| Spider Sulfur | — | — | 0.3 | — |
| C-50 | — | — | 6.0 | — |
| Cure | | | | |
| Temp., °F. | 340 | 340 | 340 | 340 |
| Time, Mins. | 30 | 30 | 30 | 30 |

TABLE VI

Part A
Example 3 Vulcanizate Properties

| Physical Properties | 16 | 17 | 18 | 19 | 20 |
|---|---|---|---|---|---|
| Unaged | | | | | |
| Tensile, psi | 1300 | 1400 | 1350 | 1500 | 1290 |
| 100% Modulus, psi | 830 | 850 | 970 | 850 | 620 |
| % Elongation | 200 | 190 | 170 | 190 | 200 |
| Hardness, Shore A | 79 | 74 | 77 | 76 | 65 |
| Gehman, T100, °C. | −27 | −30 | −25 | −25 | −36 |
| Aged, 72 Hours @ 350° F. | | | | | |
| Tensile, psi | 1570 | 1470 | 1520 | 1510 | 1280 |
| 100% Modulus, psi | 1070 | 1120 | 1220 | 1020 | 750 |
| % Elongation | 160 | 170 | 145 | 180 | 180 |
| Hardness, Shore A | 88 | 90 | 90 | 88 | 74 |
| Compression Set, % 22 hrs. @ 300° F. | 21 | 9 | 24 | 12 | 21 |
| % Swell in ASTM #3 Oil, 72 hrs. @ 300° F. | 68 | 65 | 67 | 69 | 53 |
| % Ester (—COO—) in Graft Copolymer | 31.3 | 32.5 | 32.1 | 31.7 | 30.0 |

| Physical Properties | 21 | 22 | 23 | 24 |
|---|---|---|---|---|
| Unaged | | | | |
| Tensile, psi | 1200 | 1320 | 1300 | 1360 |

TABLE VI-continued

| | | | | |
|---|---|---|---|---|
| 100% Modulus, psi | 770 | 800 | 760 | 710 |
| % Elongation | 210 | 190 | 200 | 200 |
| Hardness, Shore A | 73 | 71 | 72 | 71 |
| Gehman, T100, °C. | −30 | −27 | −27 | −15 |
| Aged, 72 Hours @ 350° F. | | | | |
| Tensile, psi | 1280 | 1530 | 1370 | 1350 |
| 100% Modulus, psi | 850 | 920 | 780 | 830 |
| % Elongation | 180 | 160 | 180 | 180 |
| Hardness, Shore A | 73 | 76 | 77 | 84 |
| Compression Set, % | | | | |
| 22 hrs. @ 300° F. | 16 | 15 | 14 | 19 |
| % Swell in ASTM #3 | | | | |
| Oil, 72 hrs. @ 300° F. | 79 | 82 | 74 | 77 |
| % Ester (—COO—) in | | | | |
| Graft Copolymer | 31.3 | 30.8 | 30.0 | 31.4 |

| Physical Properties | 25 | 26 | 27 | 28 |
|---|---|---|---|---|
| Unaged | | | | |
| Tensile, psi | 1240 | 1090 | 1070 | 880 |
| 100% Modulus, psi | 780 | 690 | 630 | 730 |
| % Elongation | 180 | 200 | 200 | 130 |
| Hardness, Shore A | 75 | 73 | 72 | 66 |
| Gehman, T100, °C. | −14 | −17 | −31 | — |
| Aged, 72 Hours @ 350° F. | | | | |
| Tensile, psi | 1510 | 1370 | 1420 | — |
| 100% Modulus, psi | 980 | 1040 | 1000 | — |
| % Elongation | 160 | 150 | 160 | — |
| Hardness, Shore A | 82 | 82 | 78 | — |
| Compression Set, % | | | | |
| 22 hrs. @ 300° F. | 26 | 29 | 31 | — |
| % Swell in ASTM #3 | | | | |
| Oil, 72 hrs. @ 300° F. | 69 | 69 | 65 | — |
| % Ester (—COO—) in | | | | |
| Graft Copolymer | 30.4 | 33.1 | 32.1 | 30.2 |

| Physical Properties | 29 | 30 | 31 | 32 |
|---|---|---|---|---|
| Unaged | | | | |
| Tensile, psi | 1210 | 1930 | 1440 | 1030 |
| 100% Modulus, psi | 720 | 1050 | 800 | 780 |
| % Elongation | 210 | 170 | 210 | 180 |
| Hardness, Shore A | 73 | 76 | 74 | 73 |
| Gehman, T100, °C. | −22 | — | — | — |
| Aged, 72 Hours @ 350° F. | | | | |
| Tensile, psi | 1250 | 2020 | 1690 | 1620 |
| 100% Modulus, psi | 910 | — | — | 1470 |
| % Elongation | 140 | 80 | 80 | 110 |
| Hardness, Shore A | 79 | 92 | 85 | 85 |
| Compression Set, % | 24 | 38 | 39 | 41 |
| 22 hrs. @ 300° F. | | | | |
| % Swell in ASTM #3 | 68 | 54 | 82 | 63 |
| Oil, 72 hrs. @ 300° F. | | | | |
| % Ester (—COO—) in | 30.9 | 32.3 | 30.2 | 30.2 |
| Graft Copolymer | | | | |

What is claimed is:

1. A mixed copolymerizate vulcanizable to an elastomeric state characterized by heat and oil resistance, comprising:
   (A) a rubbery spine which is an elastomeric copolymer of ethylene with a higher alpha-monoolefin having the formula $CH_2\!=\!CHR$ wherein R is an alkyl radical having one to four carbon atoms, with or without a copolymerizable non-conjugated diene, said rubbery spine having an iodine number not greater than 20 and a Mooney viscosity ML-4 of less than 100 at 100° C.;
   (B) acrylic ester type monomeric material in an amount sufficient to provide an ester group (—COO—) content in the mixed copolymerizate of from 25 to 40% by weight comprising:
   (a) alkyl acrylate monomeric material made up of lower alkyl acrylate monomers in which the alkyl group has from 1 to 4 carbon atoms;
   (b) 0 to 20 parts, per 100 parts by weight of lower alkyl acrylate (a), of a higher alkyl acrylate or methacrylate monomer in which the alkyl group has from 5 to 12 carbon atoms; and
   (C) 2 to 15 parts, per 100 parts by weight of the rubber spine (A), of at least one additional different ethylenically unsaturated monomer which serves to enhance the vulcanizability of the copolymerizate, the said (B) and (C) being graft copolymerized in the presence of the rubber spine (A), in which (a) is a mixture of methyl acrylate with another lower alkyl acrylate whose homopolymer has a Tg of less than 0° C.,
   the "B" gel content of the unvulcanized copolymerizate being less than 40% by weight, measured in xylene at 135° C.,
   and (C) being selected from the group consisting of methoxyethyl acrylate, ethoxyethyl acrylate, n-butoxyethyl acrylate, butoxyethoxylethyl acrylate, glycidyl acrylate, furfuryl acrylate, tetrahydrofurfuryl acrylate, phenoxyethyl acrylate, N,N-dimethylaminoethyl acrylate N,N-diethylaminoethyl acrylate, 2-chloroethyl acrylate, 3-chloroethyl acrylate, 2-cyanoethyl acrylate, allyl acrylate, methallyl acrylate, the methacrylate analogs of the aforementioned acrylates, allyl glycidyl ether, allyl maleate, allyl fumarate, allyl phthalate, butadiene, isoprene, 4-vinylcyclohexene, dicyclopentadiene, ethylidene norbornene, 1,4-hexadiene, 1,5-hexadiene, vinyl acetate, 2-chloroethyl vinyl ether, vinyl benzyl chloride, vinyl alpha-chloroacetate, and acrylic acid.

2. A mixed copolymerizate as in claim 1 having a Mooney viscosity, ML-4, of 40–80 at 212° F.

* * * * *